US008180809B2

(12) United States Patent
Cohen

(10) Patent No.: US 8,180,809 B2
(45) Date of Patent: May 15, 2012

(54) METHOD FOR EFFICIENT DATA TRANSFORMATION

(75) Inventor: Simona Cohen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/033,024

(22) Filed: Feb. 19, 2008

(65) Prior Publication Data
US 2011/0072053 A9    Mar. 24, 2011

Related U.S. Application Data

(62) Division of application No. 10/211,171, filed on Aug. 1, 2002, now Pat. No. 7,356,480.

(51) Int. Cl.
G06F 7/00 (2006.01)
(52) U.S. Cl. ........................................ 707/803
(58) Field of Classification Search .................. 707/790, 707/786, 803
See application file for complete search history.

(56) References Cited

U.S. PATENT DOCUMENTS

| | | | | |
|---|---|---|---|---|
| 5,261,080 A * | 11/1993 | Khoyi et al. | ..................... | 710/65 |
| 5,418,717 A * | 5/1995 | Su et al. | ............... | 704/9 |
| 5,694,578 A * | 12/1997 | Upson et al. | ..................... | 710/73 |
| 5,884,310 A * | 3/1999 | Brichta et al. | .................. | 707/707 |
| 6,877,150 B1 * | 4/2005 | Miller et al. | .................... | 716/103 |
| 7,133,407 B2 * | 11/2006 | Jinzaki et al. | ............ | 370/395.64 |
| 7,263,512 B2 * | 8/2007 | McGoveran | .................. | 707/707 |
| 7,356,480 B2 * | 4/2008 | Cohen | .......................... | 705/7.11 |
| 7,398,507 B2 * | 7/2008 | Chang et al. | ................... | 716/103 |
| 7,525,939 B2 * | 4/2009 | Abe et al. | ....................... | 370/328 |
| 7,616,984 B2 * | 11/2009 | Barbour et al. | ................ | 600/473 |
| 8,032,828 B2 * | 10/2011 | Su et al. | ........................ | 715/235 |
| 2001/0009547 A1 * | 7/2001 | Jinzaki et al. | ................. | 370/390 |
| 2003/0187864 A1 * | 10/2003 | McGoveran | ................... | 707/707 |
| 2004/0024625 A1 * | 2/2004 | Cohen | .............................. | 705/7 |
| 2005/0108265 A1 * | 5/2005 | Langkafel et al. | ............ | 707/707 |
| 2005/0154979 A1 * | 7/2005 | Chidlovskii et al. | ........... | 715/513 |
| 2006/0056338 A1 * | 3/2006 | Abe et al. | ....................... | 370/328 |
| 2007/0266347 A1 * | 11/2007 | Chang et al. | ....................... | 716/3 |
| 2008/0021912 A1 * | 1/2008 | Seligman et al. | .............. | 707/707 |

OTHER PUBLICATIONS

Matthias Muller—Hannemann, "Drawing Trees, Series—Parallel Digraphs, and Lattices," LNCS 2025, pp. 46-70, 2001.*
Muller—Hammermann, Drawing Trees, Series—Parallel digraphs, and Lattices, Lecture Notes in Computer Science, springer Berlin/Heidelberg, 2001.*
Mahlmann, distributed Random Digraph Transformations for Peer to peer networks, ACM, 2006.*
Arinyo, Revisiting Decomposition Analysis of Geometric Constraint graphs, ACM 2002.*
Gutin, TPS Tour Domination and Hamilton Cycle Decompositions of Regular Graphs, Operations Research Letters, 2001.*
Muller—Hammermann, Drawing Trees, Series—Parallel Digraphs, and Lattices, Leccture Notes in Computer Science, Springer Berlin/Heidelberg, 2001.*
Hartmann, decomposition by Pivoting and Path Cardinality Constraints, Lecture Notes in Computer Science, Springer Berlin/Heidelberg, 2000.*

(Continued)

Primary Examiner — Shahid Alam
Assistant Examiner — Alexandria Bromell
(74) Attorney, Agent, or Firm — Dan Swirsky

(57) ABSTRACT

A digraph including a plurality of ordinary nodes, at least one of a composition node and a decomposition node, and a plurality of arcs interconnecting any of said nodes.

3 Claims, 8 Drawing Sheets

OTHER PUBLICATIONS

Mahimann, Distributed Random Digraph Transformations for Peer to Peer Networks, ACM, 2006.*

Arinyo, Revisiting Decomposition Analysis of Geometric Constraint Graphs, ACM, 2002.*

* cited by examiner

METHOD FOR EFFICIENT DATA TRANSFORMATION

CROSS-REFERENCE TO RELATED APPLICATIONS

The present application is a divisional application of and claims priorify benefit from U.S. patent application Ser. No. 10/211,171, now U.S. Pat. No. 7,356,480, filed on Aug. 1, 2002.

FIELD OF THE INVENTION

The present invention relates to data transformation.

BACKGROUND OF THE INVENTION

In today's business environment, many applications and solutions need to use data that are expressed in different formats and languages. Effective use of data often requires that data be transformed from one data format into another.

For example, healthcare providers, such as physicians, create large volumes of patient information at healthcare facilities, such as hospitals, clinics, laboratories, and medical offices. Often, a patient may be treated by more than one healthcare provider, necessitating that the patient's records at one healthcare provider be readily available to other healthcare providers, as this information might be critical to the healthcare provider when treating the patient. Unfortunately, the wide variety of formats in which information is stored might impede the healthcare provider's ability to assimilate the information. Although medical data may be converted from one format to another to facilitate data interchange and thereby potentially improve patient care, doing so efficiently and at a minimum cost is vital in light of spiraling medical costs.

In many cases, transformation of data from a source format into a target format is carried out as a series of transformations to one or more intermediate data formats. While transformations might also be required that unify multiple data formats (i.e., many-to-one cardinality), that result in several target formats (i.e., one-to-many cardinality), or both (i.e., many-to-many cardinality), techniques for determining the most efficient paths for transformations of various cardinalities do not currently exist.

SUMMARY OF THE INVENTION

The present invention discloses a method for efficient data transformation, particularly where multiple transformation paths are available and where transformations may be one-to-one, one-to-many, many-to-one, or many-to-many. The present invention facilitates efficient data transformation and interchange in fields such as, but not limited to, medical records management, multimedia production, and business data warehousing.

In the present invention, a table of data transformations and their associated costs are expressed in a single digraph, where source and target data formats are represented as nodes connected by cost-labeled arcs. Each arc connecting the nodes has a nonnegative cost, where the cost may be expressed in terms of transformation execution time, labor costs, or any other costs. The most efficient transformation paths from the sources to the targets are then determined as those transformation paths that incur the lowest accumulated cost.

In one aspect of the present invention a digraph is provided including a plurality of ordinary nodes, at least one of a composition node and, a decomposition node, and a plurality of arcs interconnecting any of the nodes.

In another aspect of the present invention the composition node is connected to at least two of the nodes via arcs incoming to the composition node and to one other of the nodes via an arc outgoing to the other node.

In another aspect of the present invention the decomposition node is connected to one of the nodes via an arc incoming to the composition node and to at least two other of the nodes via arcs outgoing to the other nodes.

In another aspect of the present invention the ordinary nodes represent data formats.

In another aspect of the present invention a first one of the ordinary nodes connected via an outgoing one of the arcs to a second one of the ordinary nodes represents a transformation of one data format into another.

In another aspect of the present invention any of the arcs has an associated non-negative cost.

In another aspect of the present invention a method is provided for constructing a digraph from a plurality of source-to-target traversals, the method including representing the sources and targets as a plurality of ordinary nodes, representing any of the traversals having a one-to-one cardinality by connecting the source node of the traversal to the target node of the traversal by an arc outgoing from the source node, and performing any of the following representing any of the traversals having a many-to-one cardinality by connecting the source nodes of the traversal to a composition node by arcs outgoing from the source nodes, and by connecting the composition node to the target node of the traversal by an arc outgoing from the composition node, representing any of the traversals having a one-to-many cardinality by connecting the source node of the traversal to a decomposition node by an arc outgoing from the source node, and by connecting the decomposition node to the target nodes of the traversal by arcs outgoing from the decomposition node, and representing any of the traversals having a many-to-many cardinality by connecting the source nodes of the traversal to a composition node by arcs outgoing from the source nodes, by connecting the composition node to a decomposition node by an arc outgoing from the composition node, and by connecting the decomposition node to the target nodes of the traversal by arcs outgoing from the decomposition node.

In another aspect of the present invention the method further includes associating a non-negative cost with any of the arcs.

In another aspect of the present invention a method is provided of efficient path discovery in a digraph including a plurality of ordinary nodes, at least one of a composition node and a decomposition node, and a plurality of arcs interconnecting any of the nodes, the method including providing a source node s connected to a set S of source nodes in the digraph via outgoing arcs of zero cost, initializing to zero a cumulative cost of the path to s, providing a composition node t' connected to a set T of target nodes in the digraph via incoming arcs of zero cost, providing a target node t connected to composition node t' via an incoming arc of zero cost, defining a set W of nodes in the digraph initially including only node s, defining a set V of all nodes in the digraph, determining the cumulative costs of the paths to all nodes y in V that are connected to node s by an arc, while W<>V selecting a node x in V from all nodes in V that are not in W whose cumulative cost is minimal, adding node x to W, and for each node y in V to which x has an outgoing arc if y is not a composition node, determining the cumulative cost of the path to y as the lesser of a) the current known cumulative cost of the path to y, and b) the cumulative cost of the path to x plus the cost of the arc connecting x to y, if y is a composition node, and all nodes that have outgoing arcs to y are in W, determining the cumulative cost of the path to y as the lesser of a) the current known cumulative cost of the path to y, and b) the sum of the cumulative costs of the paths to all nodes that have outgoing arcs to y.

In another aspect of the present invention the method further includes determining the most efficient path from node s to a destination node selected from any of the nodes as including the arcs whose cost was added to the final cumulative cost of the destination node.

In another aspect of the present invention the method further includes determining the most efficient path from S to T as including the arcs whose cost was added to the final cumulative costs of the nodes of T.

In another aspect of the present invention the step of determining the most efficient path includes a) traversing each incoming arc of each node in T whose cost was added to the final cumulative cost of each current node, to arrive at one or more next nodes in the path, b) traversing each incoming arc of each node arrived at in the previous step whose cost was added to the final cumulative cost of each node arrived at in the previous step, to arrive at one or more next nodes in the path, and c) repeating step b) until the currently-arrived-at nodes are the nodes of S, where the traversed arcs together form the most efficient path from S to T.

In another aspect of the present invention a computer program is provided embodied on a computer-readable medium, the computer program including a first code segment operative to provide a source node s connected to a set S of source nodes in a digraph via outgoing arcs of zero cost, the digraph including a plurality of ordinary nodes, at least one of a composition node and a decomposition node, and a plurality of arcs interconnecting any of the nodes, a second code segment operative to initialize to zero a cumulative cost of the path to s, a third code segment operative to provide a composition node t connected to a set T of target nodes in the digraph via incoming arcs of zero cost, a fourth code segment operative to provide a target node t connected to composition node t' via an incoming arc of zero cost, a fifth code segment operative to define a set W of nodes in the digraph initially including only node s, a sixth code segment operative to define a set V of all nodes in the digraph, a seventh code segment operative to determine the cumulative costs of the paths to all nodes y in V that are connected to node s by an arc, an eighth code segment operative, while W<>V, to select a node x in V from all nodes in V that are not in W whose cumulative cost is minimal, add node x to W, and for each node y in V to which x has an outgoing arc if y is not a composition node, determine the cumulative cost of the path to y as the lesser of a) the current known cumulative cost of the path to y, and b) the cumulative cost of the path to x plus the cost of the arc connecting x to y, if y is a composition node, and all nodes that have outgoing arcs to y are in W, determine the cumulative cost of the path to y as the lesser of a) the current known cumulative cost of the path to y, and b) the sum of the cumulative costs of the paths to all nodes that have outgoing arcs to y.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
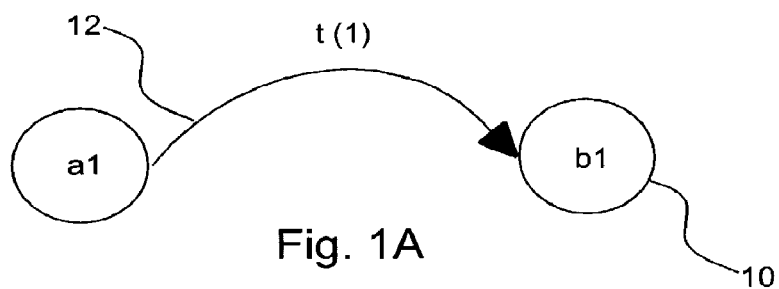
FIGS. 1A, 1B, 1C, and 1D are simplified illustrations of digraph elements, constructed and operative in accordance with a preferred embodiment of the present invention.
Figure 1B:
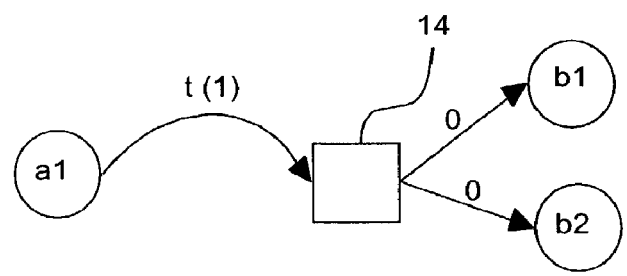
Figure 1C:
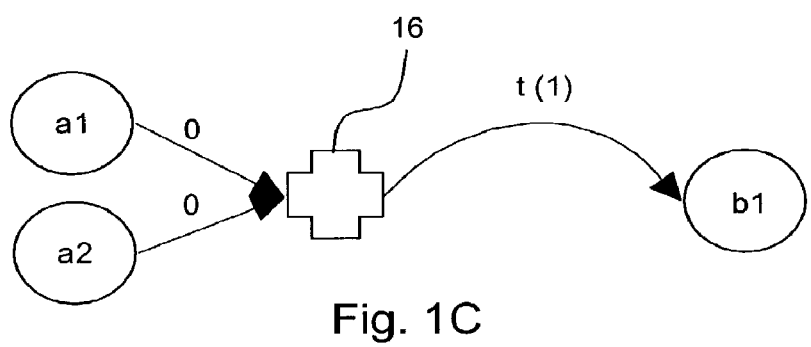
Figure 1D:
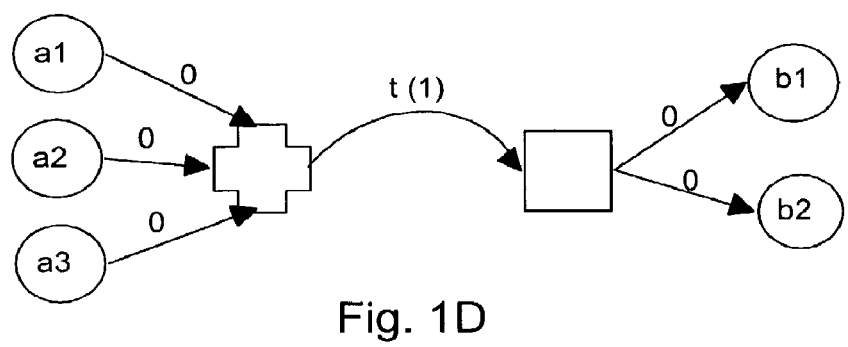

Reference is now made to FIGS. 1A, 1B, 1C, and 1D, which are simplified illustrations of digraph elements, constructed and operative in accordance with a preferred embodiment of the present invention. In accordance with the present invention, a digraph is constructed to represent one or more source-to-target traversals, such as a transformation of data from a source format into a target format, and their attendant costs. If a transformation t has a cost=1, a cardinality of one-to-one, and transforms data from format {a1} to format {b1}, the sub-graph of FIG. 1A is created, where {a1} and {b1} are represented by nodes 10 interconnected by an arc 12 whose direction indicates the logical direction of the transformation. If t has a cost=1, a cardinality of one-to-many, and transforms data from format {a1} to formats {b1,b2}, the sub-graph of FIG. 1B is created. The one-to-many cardinality is represented by a square-shaped decomposition node 14. If t has a cost=1, a cardinality of many-to-one, and transforms data from formats {a1,a2} to format {b1}, the sub-graph of FIG. 1C is created. The many-to-one cardinality is represented by a plus-shaped composition node 16. The composition node of the present invention requires that transformation t may be executed only after all data in source formats {a1,a2} exist. If t has a cost=1, a cardinality of many-to-many, and transforms data from formats {a1,a2,a3} to formats {b1,b2}, the sub-graph of FIG. 1D is created, combining the sub-graphs of FIGS. 1B and 1C. For the sake of clarity, a node that is neither a composition node nor a decomposition node is herein referred to as an ordinary node.

Figure 2:
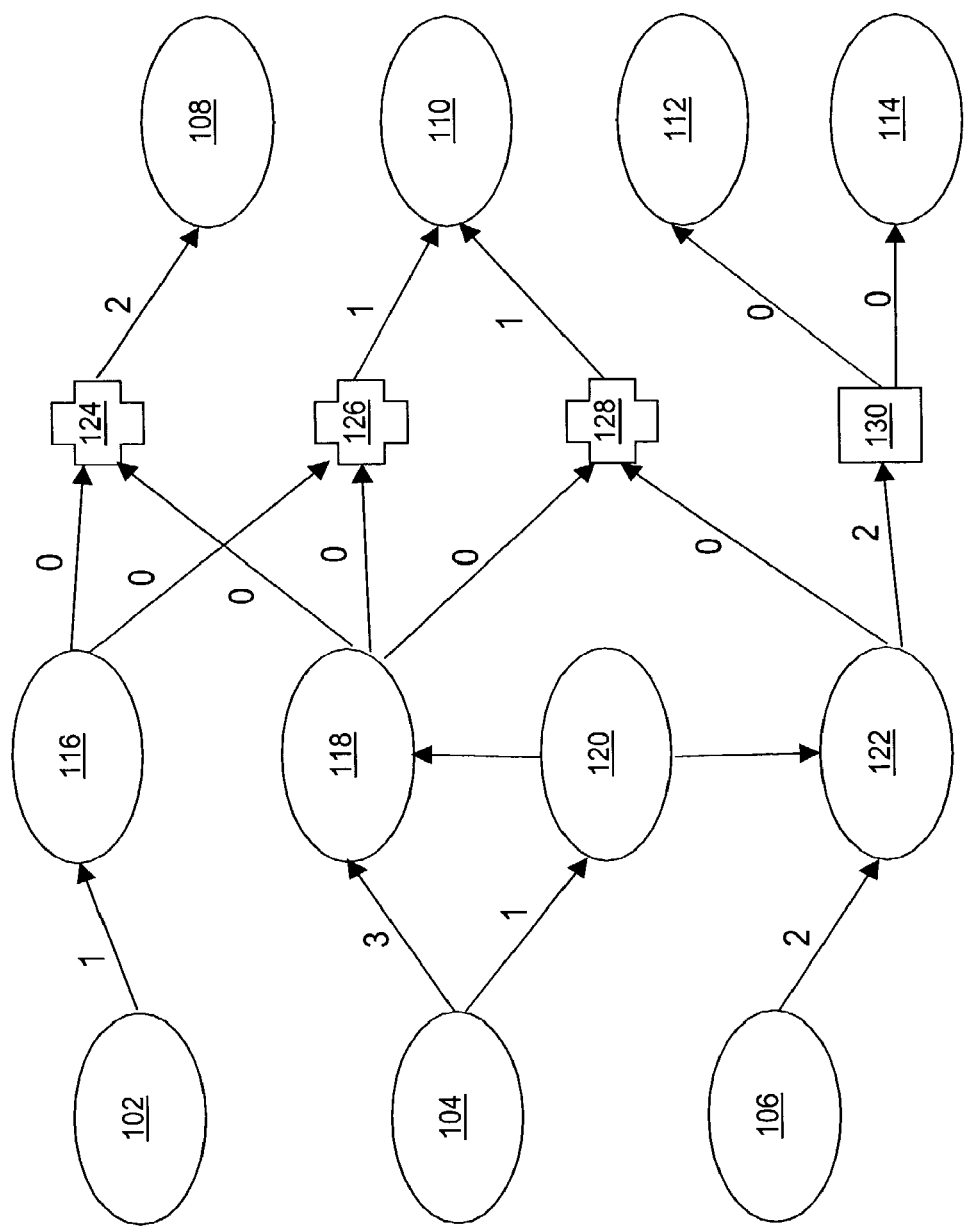
FIG. 2, which is a simplified illustration of a digraph, constructed and operative in accordance with a preferred embodiment of the present invention.

Reference is now made to FIG. 2, which is a simplified illustration of a digraph, constructed and operative in accordance with a preferred embodiment of the present invention. The digraph of FIG. 2 is an exemplary construction using the sub-graphs of FIGS. 1A 1D which models a number of transformations, shown in Table A, from source data formats, such as flat file and database (db), into target data formats, such as rtfXml and dbXml respectively. Each transformation is associated with a cost, which may represent any non-negative relevant cost, such as processing time, memory used, number of computer operations, etc.

TABLE A

| Sources | Targets | Cost |
| --- | --- | --- |
| flatFile | rtfXml | 1 |
| db | dbXml | 3 |
| db | 123 | 1 |
| wordpro | html | 2 |
| 123 | html | 0.5 |
| 123 | dbXml | 1 |
| rtfXml, dbXml | performanceML | 1 |
| html, dbXml | performanceML | 1 |
| rtfXml, dbXml | XHTML | 2 |
| html | text, gif | 2 |

It will be seen in Table A that some transformations may require multiple sources, such as the transformation of rtfXml and dbXml into performanceML, and that some transformations split a single source into multiple target formats, such as the transformation of html into text and gif.

For both diagrammatic clarity and generality of description, each source and target of Table A may be expressed as numbered nodes, such as is shown in Table B as follows:

TABLE B

| Source Nodes | Target Nodes | Cost |
|---|---|---|
| 102 | 116 | 1 |
| 104 | 118 | 3 |
| 104 | 120 | 1 |
| 106 | 122 | 2 |
| 120 | 122 | 0.5 |
| 120 | 118 | 1 |
| 116, 118 | 110 | 1 |
| 122, 118 | 110 | 1 |
| 116, 118 | 108 | 2 |
| 122 | 112, 114 | 2 |

The digraph of FIG. 2 is constructed to represent the collection of source nodes and target nodes, where each transformation is depicted, using the sub-graphs of FIGS. 1A 1D, as a set of arcs and nodes, where each arc is shown together with its associated cost.

Source node 104 is shown connected both to node 118 and to node 120. This type of digraph notation may be used to represent, for example, that a single source data format may be transformed into either of two different data formats, represented by node 118 and node 120 respectively. The arc from node 120 to node 118 may also be used to show that the source data format represented by source node 104 may be transformed into the data format represented by node 118, first via transformation into the data format represented by node 120, and then via transformation into the data format represented by node 118.

Many-to-one cardinality, such as where data in two or more data formats are to be combined into a single data format, is shown represented by plus-shaped composition nodes 124, 126, and 128, whose incoming arcs are assigned a zero cost. One-to-many cardinality, such as where one data format is to be split into or otherwise transformed into two or more different data formats, is shown represented by a square-shaped decomposition node 130. The outgoing arcs from decomposition nodes are also assigned a zero cost.

The constructed digraph of the present invention may be used as the basis for formulating a query whose purpose is to determine the most efficient path between any two nodes or between any two groups of nodes, where efficiency is defined as the lowest cumulative cost of the arcs along a given path. The decision whether to traverse a particular arc may be made by considering the cumulative cost of the arcs traversed and selecting the path having the lowest cumulative cost. A preferred method of efficient path discovery in the digraph of the present invention is now described.

Figure 3A:
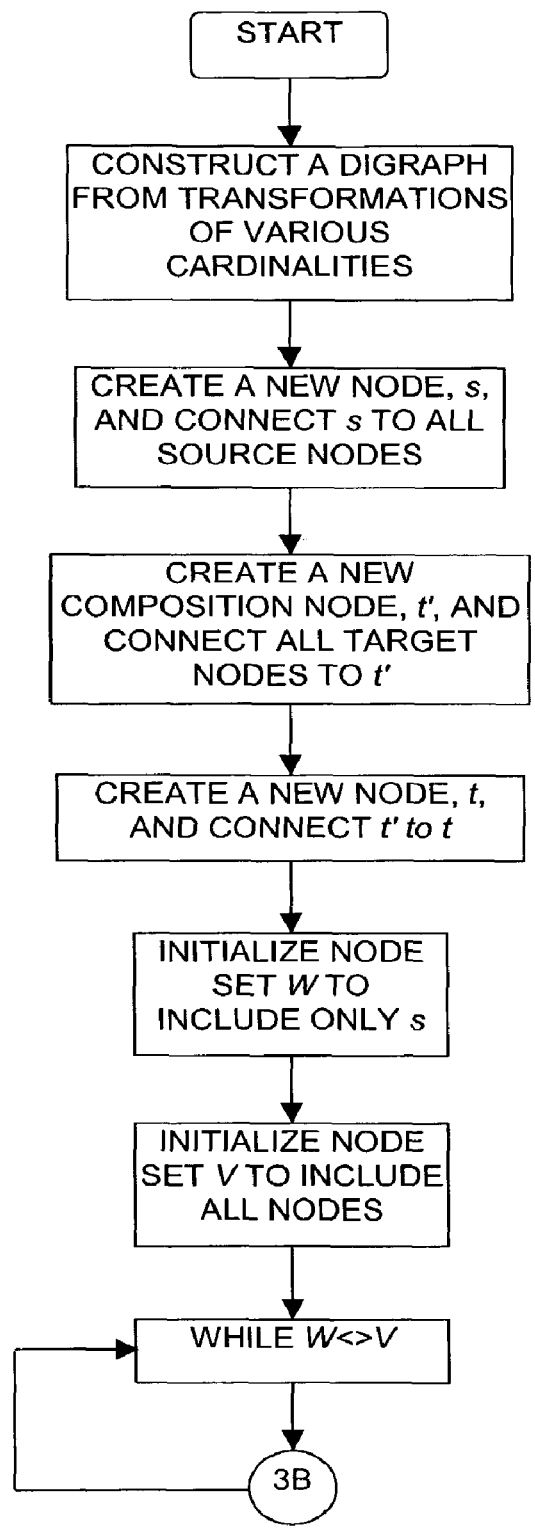
FIGS. 3A and 3B, taken together, is a simplified flowchart illustration of a method of efficient path discovery in a digraph, operative in accordance with a preferred embodiment of the present invention.
Figure 3B:
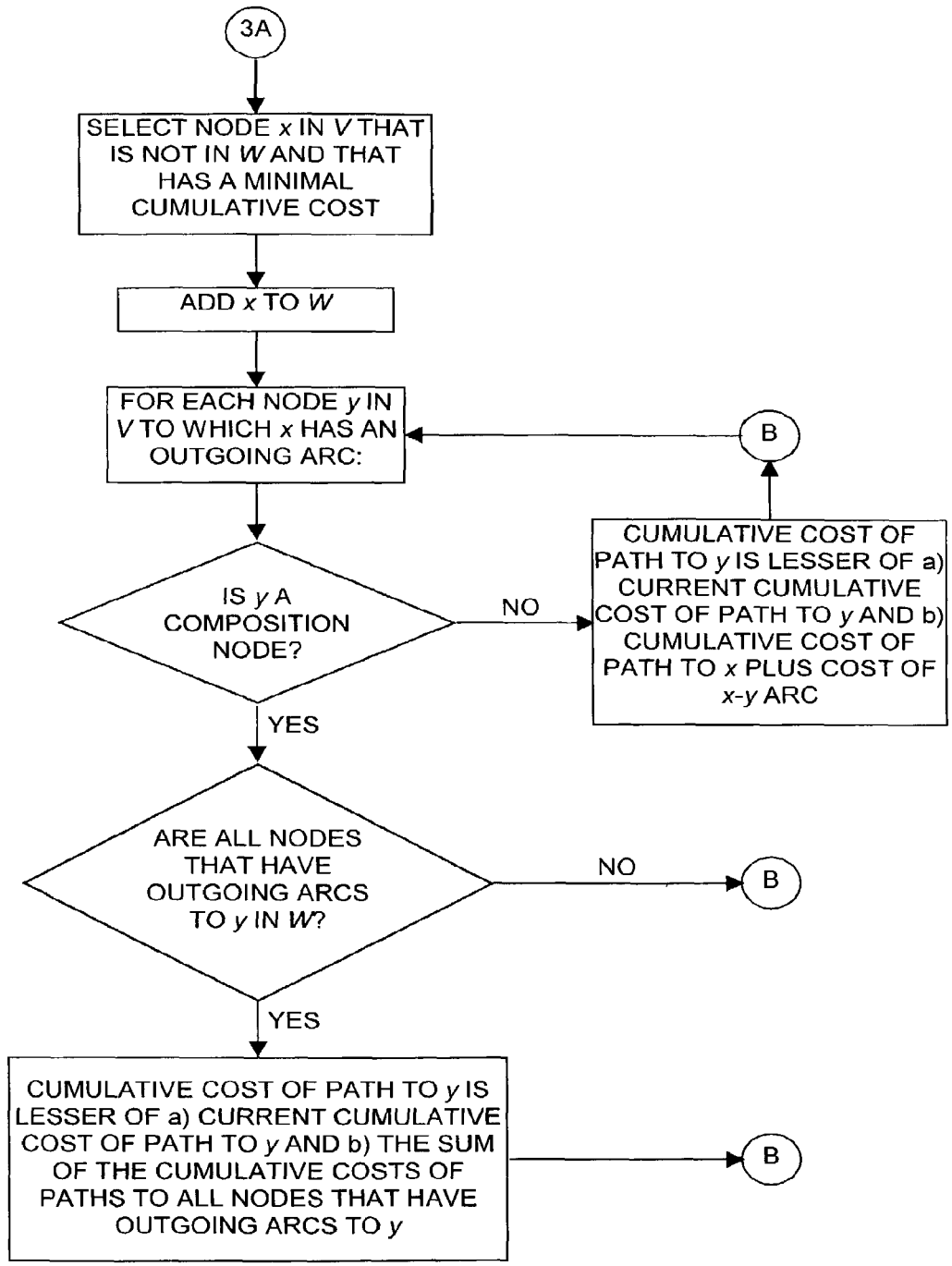

Reference is now made to FIGS. 3A and 3B, which, taken together, is a simplified flowchart illustration of a method of efficient path discovery in a digraph, operative in accordance with a preferred embodiment of the present invention. In the method of FIGS. 3A and 3B, given a set S of source nodes, a set T of target nodes, and various paths therebetween, a single source node s is introduced into the digraph and connected via outgoing arcs of zero cost to each of the source nodes S. A cumulative cost of the path to s is typically initialized to zero, since s is the node of origin for all source nodes. A single composition node t' is also defined and connected via incoming arcs of zero cost to each of the target nodes T. A single target node t is likewise defined and connected via an incoming arc of zero cost to the composition node t'.

A set W of nodes is defined and initially includes only node s. A set V is likewise defined including all nodes in the digraph. The cumulative cost of the path from s to any given node in V is initially unknown, and is, therefore, typically considered to be infinite. The following steps are then performed to find the cumulative cost from s to any node in V:

1) The cumulative costs of the paths to all nodes y in V that are connected to node s by an arc are determined by the cost of the arc.
2) While W<>W:
3) A node x in V is selected among all nodes in V that are not in W whose cumulative cost is minimal. If there is more than one minimal node, then any node x may be selected.
4) Node x is added to W.
5) For each node y in V to which x has an outgoing arc:
6) If y is not a composition node, then the cumulative cost of the path to y is the lesser of a) the current cumulative cost of the path to y, if known, and b) the cumulative cost of the path to x plus the cost of the arc connecting x to y;
7) If y is a composition node, and all nodes that have outgoing arcs to y are in W, then the cumulative cost of the path to y is the lesser of a) the current cumulative cost of the path to y, if known, and b) the sum of the cumulative costs of the paths to all nodes that have outgoing arcs toy.

The most efficient path from node s to any other destination node, and ultimately to node t, is comprised of the arcs whose cost was added to the final cumulative cost of the destination node. From this, it may be seen that the most efficient path from S to T may be derived as follows:

a) traverse each incoming arc of each node in T whose cost was added to the final cumulative cost of each current node, to arrive at one or more next nodes in the path;
b) traverse each incoming arc of each node arrived at in the previous step whose cost was added to the final cumulative cost of each node arrived at in the previous step, to arrive at one or more next nodes in the path;
c) repeat step b) until the currently-arrived-at nodes are the nodes of S. The traversed arcs together form the most efficient path from S to T It may thus be seen that the method of FIGS. 3A and 3B may be used as a method of efficient data transformation when applied to a data transformation table such as Table A hereinabove.

The method of FIGS. 3A and 3B may be alternatively understood using the following pseudocode:

| | |
|---|---|
| Input: | A digraph D = (V, A), with costs Cuv >= 0 on its arcs, and V having >= 0 composition nodes and >= 0 decomposition nodes. |
| | A set of sources nodes S such that each node in S belongs to V. |
| Output: | The lowest-cost paths from S to all nodes in V in an array p. |
| Begin: | Construct a new node, s, and add arcs with cost = 0 from s to every node in S. Construct a new node, t, and a new composition node t'. Add arcs with cost = 0 from all the nodes in T to the composition node, t', and from the composition node to t. |

-continued

```
        Add all the new nodes and arcs to the digraph D=(V,A).
        Set W := {s}; p[s] := 0 ;
        for all y such that y is a node in V with an incoming arc from s
        do p[y] := Csy ;
        while W <> V do
        begin
            find min {p[y] : y is not in W} , say p[x];
            set W := W union {x} ;
            for all y in V such that there is an arc from x to y do
            begin
                if y is not a composition node then
                    p[y] := min {p[y] , p[x] + Cxy}
                else if all nodes that have outgoing arcs to y are in W then
                    p[y] := min {p[y] ,sum of all p[z] where z has an
                        outgoing arc to y}
            end
        end
end
```

Thus, by applying the method of FIGS. 3A and 3B, the most efficient path from s to t is determined as those arcs whose cost was added to the final cumulative cost of t. From this, the most efficient path from S to T may be derived as described hereinabove.

Figure 4A:
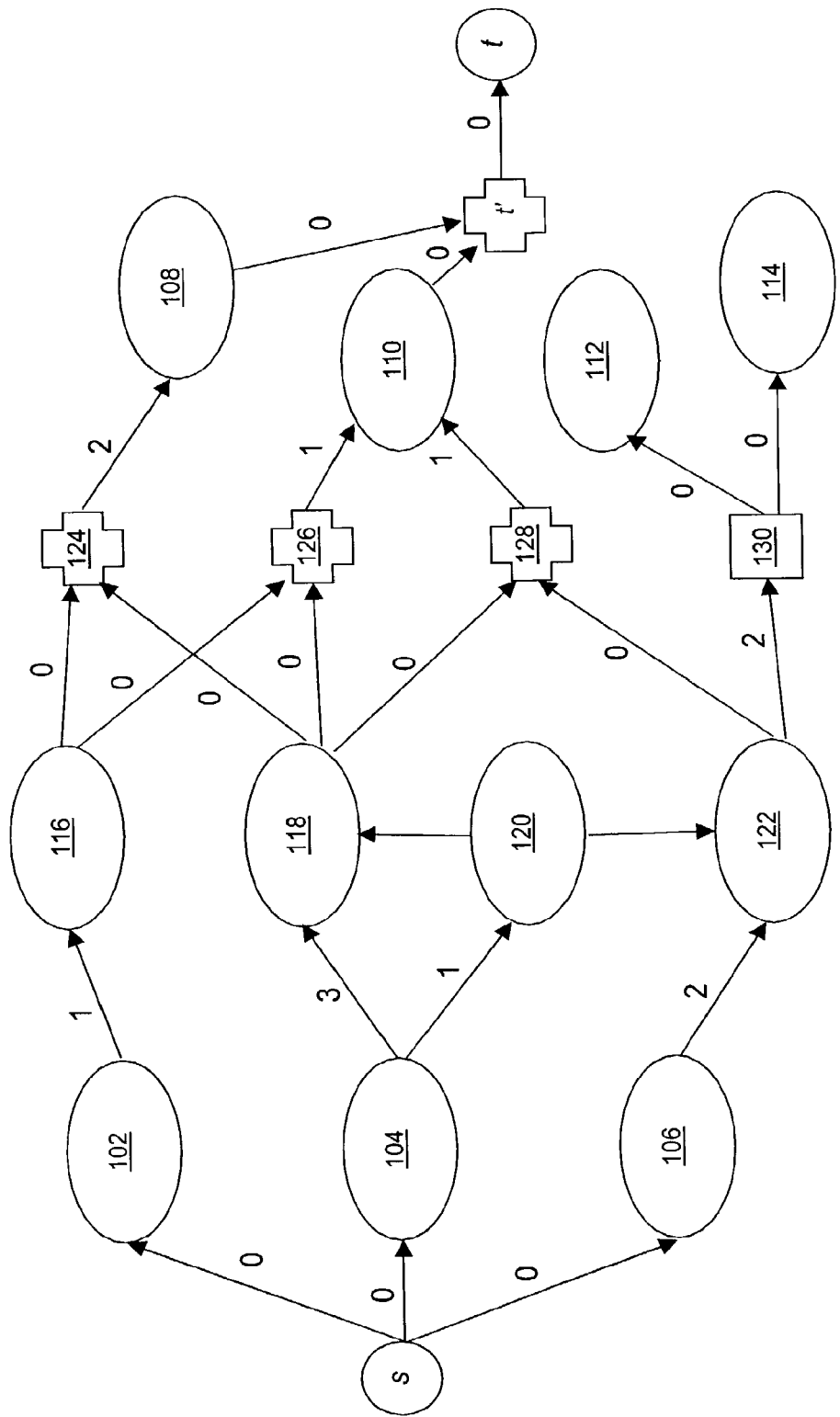
FIGS. 4A, 4B, 4C, and 4D are simplified illustrations of the digraph of FIG. 2 reflecting the application of the method of FIGS. 3A and 3B.
Figure 4B:
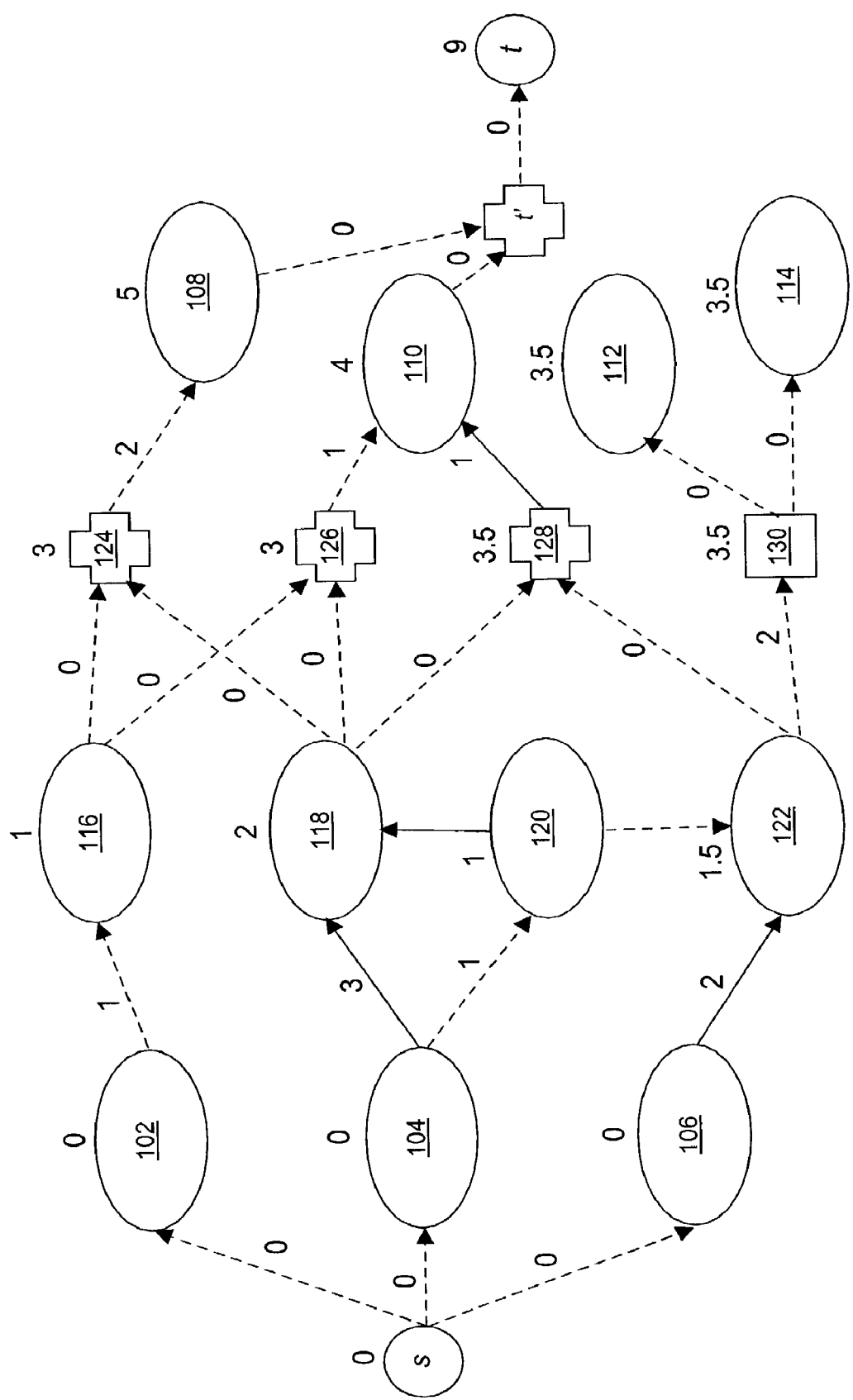
Figure 4C:
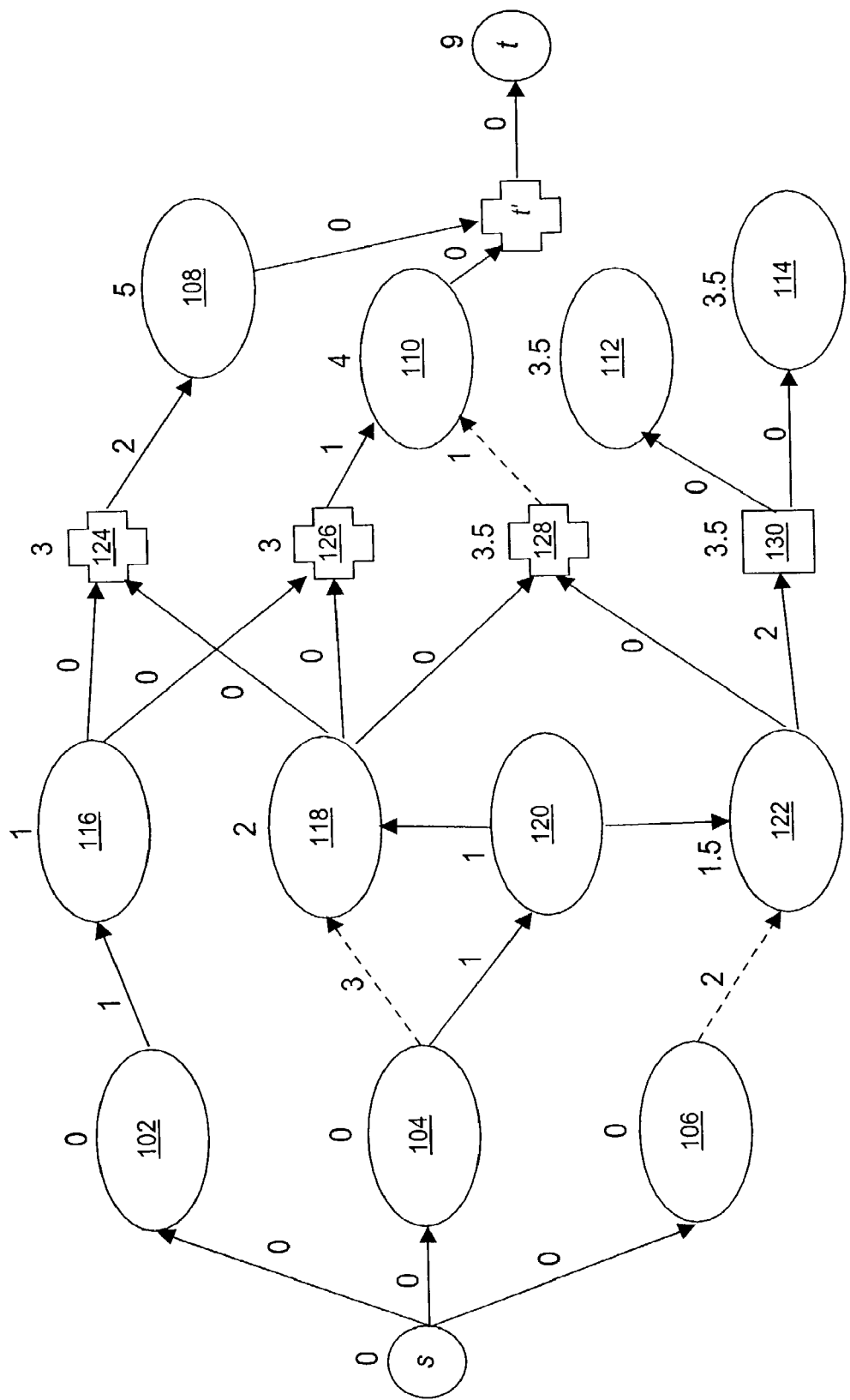
Figure 4D:
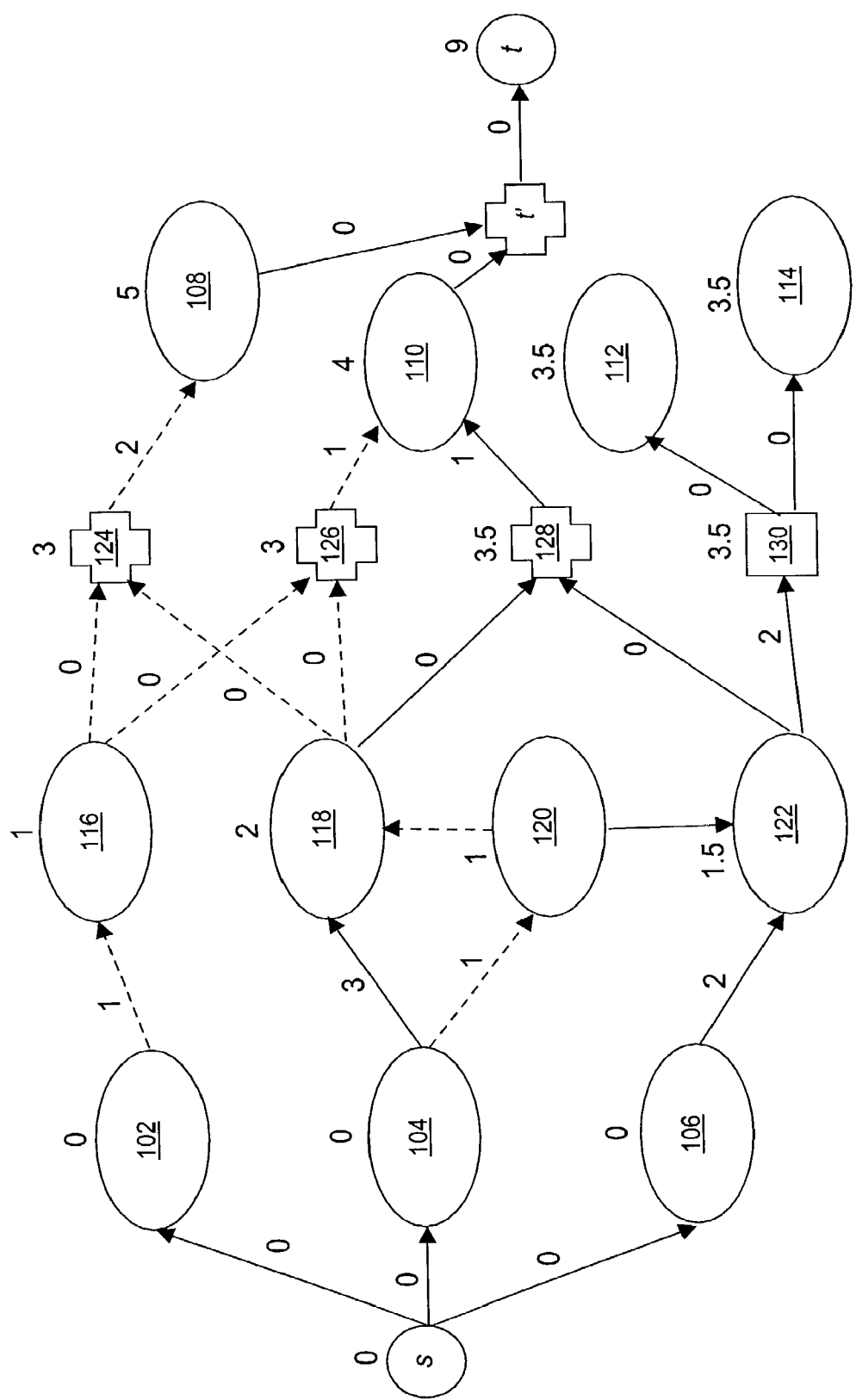

Reference is now made to FIGS. 4A, 4B, 4C, and 4D which show the digraph of FIG. 2 reflecting the application of the method of FIGS. 3A and 3B to an exemplary query in which the most efficient path is determined for the transformation of the set of source nodes 102, 104, and 106 into the set of target nodes 108 and 110. FIG. 4A shows the digraph of FIG. 2 for which s, t', and t have been defined. In FIG. 4B the arcs shown in dashed lines represent those arcs that lay along the most efficient paths from s to any node in V, and in particular to t. In FIG. 4C the arcs shown in dashed lines represent those arcs that do not lay along any efficient path and are the complementary arcs to those in FIG. 4B. Finally, in FIG. 4D the arcs shown in dashed lines represent those arcs that lay along the most efficient paths from source nodes 102, 104, and 106 to target nodes 108 and 110, being a subset of the arcs shown in FIG. 4B.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for constructing a digraph from a plurality of source-to-target traversals, the method comprising:

representing in a graph a one-to-many transformation of electronic data from a source data format into a plurality of target data formats, wherein said one-to-many transformation is represented in said graph by a node representing said source data format, a plurality of nodes representing said target data formats, and a node that is identified as a decomposition node representing a one-to-many transformation, wherein said node representing said source data format is connected to said decomposition node by an arc having an associated non-zero cost representing a cost of said one-to-many transformation, and wherein said decomposition node is connected to said plurality of nodes representing said target data formats by a corresponding plurality of arcs having an associated zero cost per arc;

representing in said graph a many-to-one transformation of electronic data from a plurality of source data formats into a target data format, wherein said many-to-one transformation is represented in said graph by a plurality of nodes representing said source data formats, a node representing said target data format, and a node that is identified as a composition node representing a many-to-one transformation, wherein said plurality of nodes representing said source data formats are connected to said composition node by a corresponding plurality of arcs having an associated zero cost per arc, wherein said composition node is connected to said node representing said target data format by an arc having an associated non-zero cost representing a cost of said many-to-one transformation and that is traversable only after all of said arcs from said source data formats to said composition node are traversed, and wherein said nodes representing said source data formats and said nodes representing said target data formats are identifiably distinguishable from said composition node and said decomposition node, wherein said composition node is identifiably distinguishable from said decomposition node, and wherein said representing steps are embodied in any of a) computer hardware, and b) computer software embodied in a non-transitory, computer-readable medium.

2. A method according to claim 1 and further comprising associating a non-negative cost with any of said arcs.

3. A method according to claim 1 and further comprising representing in said graph a many-to-many transformation of electronic data from said plurality of source data format nodes connected to said composition node into said plurality of target data format nodes connected to said decomposition node by connecting said composition node to said decomposition node by an arc outgoing from said composition node to said decomposition node and having an associated non-zero cost representing a cost of said many-to-many transformation and that is traversable only after all of said arcs from said source data formats to said composition node are traversed.

* * * * *